US012748526B2

(12) United States Patent
Doddaiah et al.

(10) Patent No.: US 12,748,526 B2
(45) Date of Patent: Sep. 29, 2026

(54) SELECTIVE INLINE COMPRESSION USING DATA PROCESSING UNIT ON A PARALLEL FILE SYSTEM

(71) Applicant: Dell Products L.P., Round Rock, TX (US)

(72) Inventors: Ramesh Doddaiah, Westborough, MA (US); Xiangping Chen, Sherborn, MA (US); Jonathan Ichael Krasner, Coventry, RI (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 19/023,808

(22) Filed: Jan. 16, 2025

(65) Prior Publication Data

US 2026/0202962 A1 Jul. 16, 2026

(51) Int. Cl.
*G06F 3/06* (2006.01)
*G06F 16/2455* (2019.01)
*G06F 16/25* (2019.01)

(52) U.S. Cl.
CPC .......... *G06F 3/0608* (2013.01); *G06F 3/0655* (2013.01); *G06F 3/0673* (2013.01); *G06F 16/24561* (2019.01); *G06F 16/258* (2019.01)

(58) Field of Classification Search
CPC .... G06F 3/0608; G06F 3/0655; G06F 3/0673; G06F 16/24561; G06F 16/258; G06F 11/1435; G06F 2212/40
See application file for complete search history.

(56) References Cited

U.S. PATENT DOCUMENTS

| | | | | |
|---|---|---|---|---|
| 11,327,929 | B2 * | 5/2022 | Li | G06F 16/1744 |
| 12,099,997 | B1 * | 9/2024 | Hoffberg | G06Q 20/065 |
| 12,164,537 | B1 * | 12/2024 | James Lewis | H04L 9/50 |
| 2018/0367161 | A1 * | 12/2018 | Ki | H03M 7/6088 |
| 2022/0206864 | A1 * | 6/2022 | Nadathur | G06F 8/63 |
| 2023/0090253 | A1 * | 3/2023 | Meadows | H04L 67/12 345/419 |

* cited by examiner

*Primary Examiner* — Marcin R Filipczyk

(74) *Attorney, Agent, or Firm* — Chamberlain, Hrdlicka, White, Williams & Aughtry; Aly Z. Dossa

(57) ABSTRACT

Embodiments disclosed herein relate to selective inline compression of data using data processing units (DPUs) of hosts running on the file system prior to storing the data on a remote storage system. To be compressed by the DPUs of the hosts, data should be not already compressed, the data should not subject to frequent read/write cycles off the remote storage system, and the DPU should have sufficient computing resources to compress the data. A file system is connected to the hosts and the remote storage. The file system provides a file heatmap that forecasts whether the data is frequently accessed. The file heatmap is created using machine learning models. After receiving the file heatmap, the host writes the data to the remote storage system and uses the file heatmap to determine if the data should be compressed.

8 Claims, 4 Drawing Sheets

SELECTIVE INLINE COMPRESSION USING DATA PROCESSING UNIT ON A PARALLEL FILE SYSTEM

BACKGROUND

Artificial Intelligence (AI) training data and checkpoints that store the AI model's state during training (e.g., model weights and optimizer states) are large data sets that are stored in storage servers. Inline compression may reduce storage and network transfer requirements for these large data sets. Inline compression is preformed using a computer processing unit (CPU) of a file system. Using the CPU is memory-intensive and can pose challenges for file system clients that primarily use data processing units (DPU) and have limited CPU and memory bandwidth.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

DETAILED DESCRIPTION

In traditional file systems inline compression may reduce storage and network transfer requirements for these large data sets. Inline compression is performed using a computer processing unit (CPU) of a file system. Using the CPU is memory-intensive and can pose challenges for file system clients that primarily use data processing units (DPU) and have limited CPU and memory bandwidth. Further, some file systems rely on direct input/output to remote storage servers meaning data cannot be compressed in the remote storage servers. Certain data stored in the remote storage servers do not benefit from inline compression including previously compressed data and data with frequent read/write cycles. For at least the reasons discussed above, a different approach for inline compression for file systems may be beneficial.

Embodiments disclosed herein relate to compressing data using DPUs of hosts operating within the file system prior to sending the data to a remote storage system. To be compressed by the DPUs of the hosts, data should be not already compressed, the data should not subject to frequent read/write cycles off the remote storage system (e.g., hot data), and the DPU should have sufficient computing resources to compress the data. A file system is connected to the hosts and the remote storage. The host requests a file layout mapping of data stored in the remote storage system along with a file heatmap that forecasts whether the data is hot data and should not be compressed. The file heatmap identifies frequently accessed files that undergo frequent updates (i.e., not suitable for compression). The file heatmap may be created using artificial intelligence models. After receiving the file heatmap, the host sends the data to the remote storage system and uses the file heatmap to determine if the data should be compressed prior to sending the data. Selective inline compression is most effective for highly compressible, infrequently accessed data, like checkpoint data for artificial intelligence applications used for recovery during training interruptions. The host running the compression on the DPU saves CPU resources, reduces the data transfer bandwidth between the host and the remote storage system, and increases storage space on the remote storage system by compressing the data.

The following describes various embodiments disclosed herein.

Figure 1:
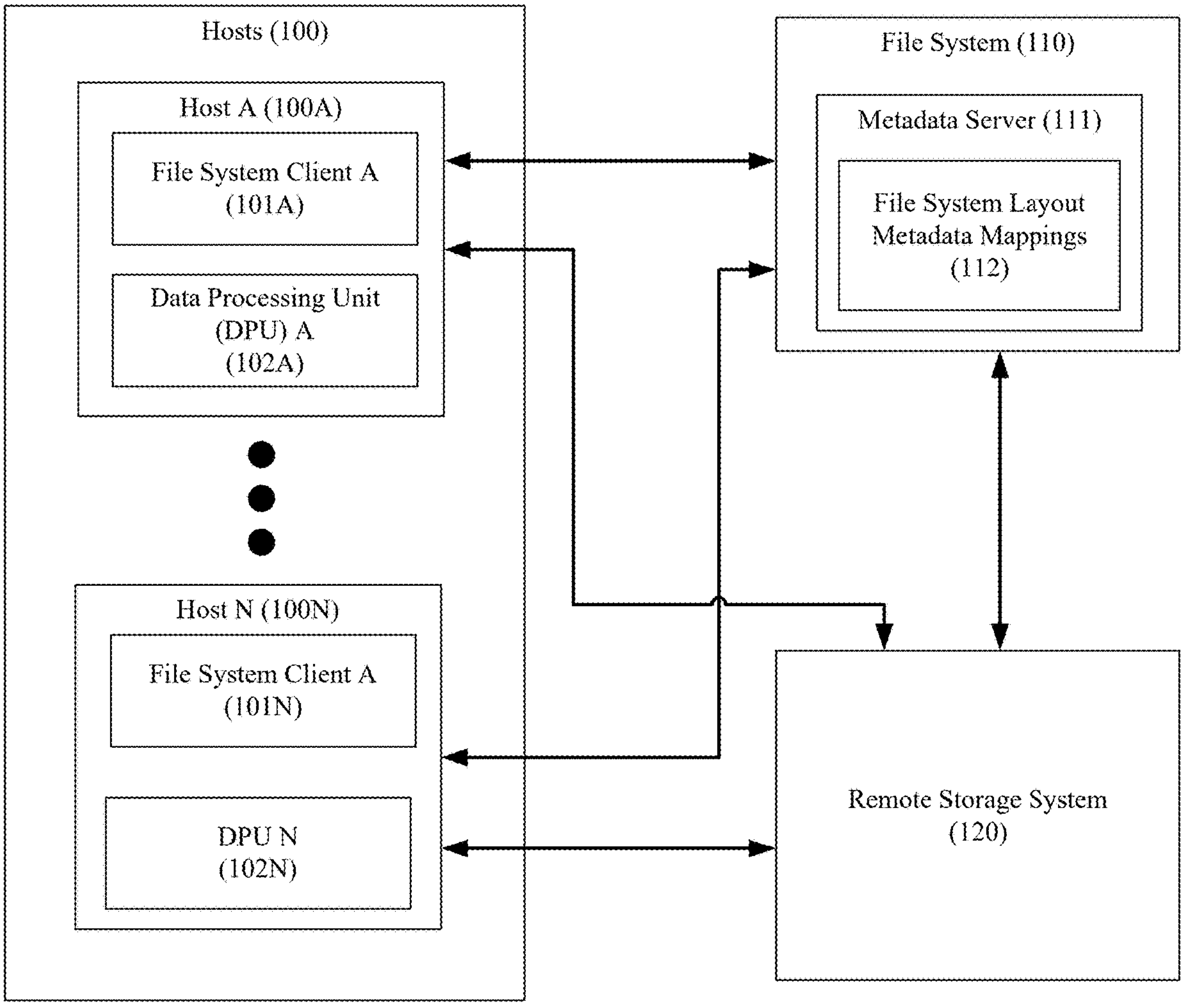
FIG. 1 shows a diagram of a system in accordance with one or more embodiments disclosed herein.

FIG. 1 shows a diagram of a system in accordance with one or more embodiments disclosed herein. The system includes hosts (100), a file system (110), and a remote storage system (120). Each of these components shown in FIG. 1 is described below.

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. Those skilled in the art will appreciate that any other type of network (or network topology) may be used without departing from the disclosure.

The hosts (100) include any number of hosts (e.g., 100A through 100N). The hosts (100) are connected to the file system (110), and the remote storage system (120). The hosts (100) are configured to be used by users to save data on the remote storage system. In one or more embodiments, the hosts (100) are user devices that receive or create the data. In one or more embodiments, the hosts (100) are operatively connected to user devices and the data is transmitted to the hosts (100) from the user devices. For example, the hosts (100) may include infrastructure nodes that have more available resources than a user device and thus may be able to complete more resource-intensive tasks or perform tasks more quickly than a user device may be capable of. In one or more embodiments, the hosts (100) include the functionality to initiate storage of checkpoint data (e.g., the model's state during training-model weights, optimizer states) and data used for AI model training (e.g., training data) and AI inferencing (e.g., applying AI models to data sets) in the remote storage system (120).

For ease of understanding, the following discussion of hosts (100) will be described with reference to one of the hosts (100), the host A (100A). It should be understood that the following discussion may apply to any host included in the hosts (100). The host A (100A) includes a file system client A (101A) and a DPU A (102A). The file system client A (101A) is a software component of the host A (100A) that allows for the host A (100A) to access and interact with (e.g., send and receive data) the remote storage system (120). In one or more embodiments, the file system client (101A) receives a file layout of the remote storage system (120) from the file system (110) to navigate the remote storage system (120). In one or more embodiments, the file system client (101A) sends data to the remote storage system (120) during a normal course of operation to safeguard data and is able to selectively compress data using the DPU A (102A) and the heatmap as discussed in further detail in FIG. 2.

In one or more embodiments, the DPU A (102A) is a specialized electronic component that includes one or more network interfaces and is designed to offload various networking tasks (e.g., packet processing, encryption, data compression, and network virtualization) from both the CPU (not shown) of the host A (100A) and the CPU (not shown) of the remote storage system (120). In one or more embodiments, the DPU A (102A) includes a hardware accelerator. The hardware accelerator is a dedicated hardware component that is designed to increase the speed of certain processing tasks. In one or more embodiments, the hardware accelerator is a compression hardware accelerator that is designed to increase the speed of data compression tasks. In one or more embodiments, the hardware compression accelerator is able to perform compression and decompression operations much faster than software (i.e., the file system client A (101A) running on the DPU) alone. Further, in one or more embodiments, the DPU A (102A) includes a software compression accelerator in addition to or alternatively to the hardware compression accelerator. The software compression accelerator includes software that is designed to take advantage of the logical construction and/or physical construction of the DPU to perform compression tasks.

Though not shown in FIG. 1, the host A (100A) may include other hardware components such as processors, volatile storage (e.g., memory), non-volatile storage (e.g., disk drives, solid state drives, etc.), and other computing components. Other hosts such as host N (100N) include the same software and hardware components described above (e.g., file system client N (101N), DPU N (102N), etc.).

Figure 3:
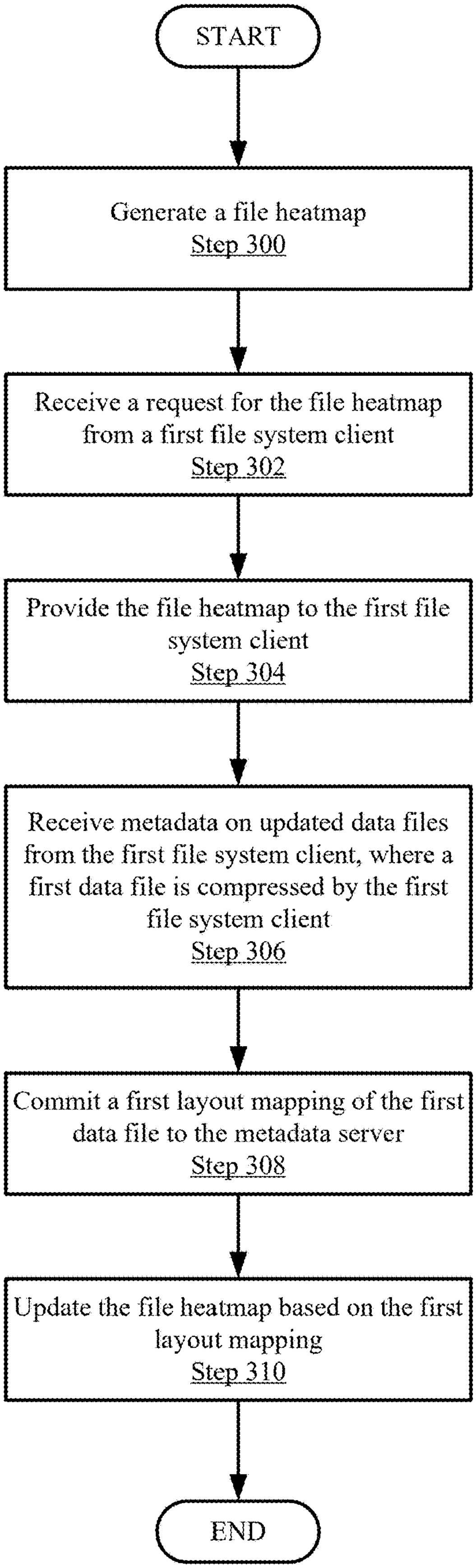
FIG. 3 shows a flowchart for a method for managing selective compression in a parallel file system in accordance one or more embodiments disclosed herein.
Figure 4:
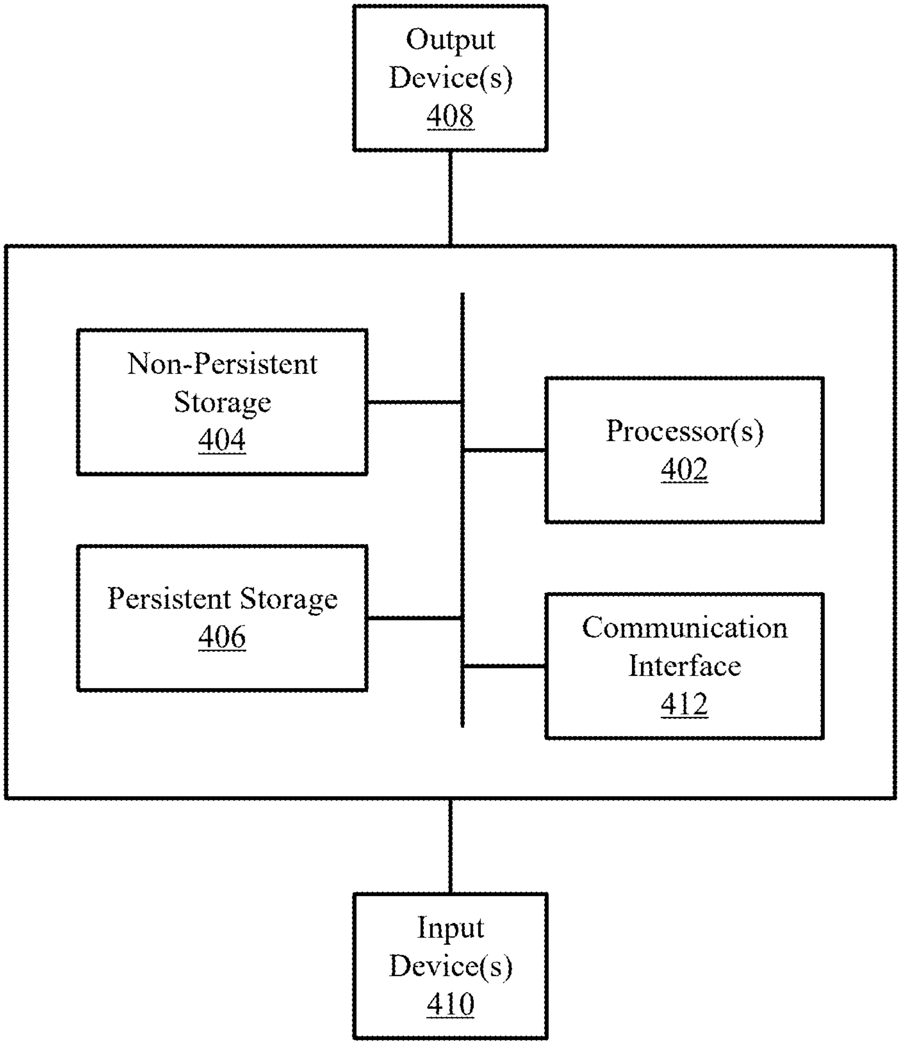
FIG. 4 shows a diagram of a computing device in accordance with one or more embodiments disclosed herein.

In one or more embodiments, the hosts (100) are implemented as one or more computing devices (see e.g., FIG. 4). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the hosts (100) described throughout this application and/or all, or a portion thereof, of the methods illustrated in FIGS. 2-3.

In one or more embodiments, the hosts (100) are implemented as a logical device(s) (e.g., a virtual machine). Each logical device may utilize the computing resources of any number of computing devices and thereby provide the functionality of the hosts (100) described throughout this application and/or all, or a portion thereof, of the methods illustrated in FIGS. 2-3.

In one or more embodiments, the file system (110) is configured to manage data stored on the remote storage system (120). In one or more embodiments, the file system (110) includes a metadata server (111) that is configured to create and update the file layout mappings of the remote storage system (120) and the file heatmaps for data stored in the remote storage system (120). In one or more embodiments, the file layout mappings and the file heatmaps are stored in file system layout metadata mappings (112) in the metadata server (111).

In one or more embodiments, the file layout mappings map out the remote storage system (120). In one or more embodiments, the file layout mapping is updated when files are added or removed from the remote storage system (120). In one or more embodiments, the hosts (100) use the file layout mapping to send data to particular locations or to associate sent data with data stored at particular location in the remote storage system (120). When the hosts (100) send the data to the remote storage system (120), new or updated file layout information is committed to the metadata server (111) including the logical to physical mapping (e.g., logical verses physical space usage) of any new or updated data files as part of sending data to the remote storage system (120). In one or more embodiments, the metadata server (111) calculates a compression ratio based on the logical to physical mapping which is used in updating the file layout mapping.

In one or more embodiments, the file heatmaps are a heatmap that predicts if a file should be compressed using selective inline compression. Data that is used frequently (e.g., accessed above a threshold amount) is "hot" data. Data that is not used frequently (e.g., accessed below a threshold amount) is "cold" data. Data is considered "cold" and, therefore suitable for inline compression, if a number read/write cycles of the first data file is predicted by the file heatmap below a threshold value. In one or more embodiments, the file heatmap is based on read/write cycles of stored data files stored in a remote storage system (120), other access statistics, and the compression ratio discussed above. In one or more embodiments, the file heatmap includes a compressibility setting for each file of the stored data files which includes a compression ratio for each stored data file of the stored data files.

In one or more embodiments, machine learning models (not shown) on the metadata server (111) classify and forecast usage of data to form the file heatmap. In one or more embodiments, the access statistics and the compression ratios of the stored data files, discussed above, are used as inputs to form the file heatmap. In one or more embodiments, the machine learning model includes an autoregressive integrated moving average (ARIMA) model. The ARIMA model is a statistical model that uses time series analysis to forecast future values of a data set based on a combination of past values, a difference between past values, and errors in previous predictions. In one or more embodiments, the ARIMA model is used in conjunction with the machine learning model to detect and forecast more complex data patterns in the file heatmap. In one or more embodiments, the machine learning model is combined with the ARIMA model. In one or more embodiments, the metadata server (111) updates the heatmap based on the new statistics as new data files are stored on the remote storage system (120), commitments made to the metadata server (111) by the hosts (100), and by any updates to access statistics provided by the remote storage system (120) which may be provided at a regular cadence or upon request.

In one or more embodiments, the file system (110) may be implemented as one or more computing devices (see e.g., FIG. 4). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the file system (110) described throughout this application and/or all, or a portion thereof, of the methods illustrated in FIGS. 2-3.

In one or more embodiments, the file system (110) is implemented as a logical device(s). Each logical device may utilize the computing resources of any number of computing devices and thereby provide the functionality of the file system (110) described throughout this application and/or all, or a portion thereof, of the methods illustrated in FIGS. 2-3.

In one or more embodiments, the remote storage system (120) includes the functionality to store checkpoint data and data used for AI model training and AI inferencing in the remote storage system (120). In one or more embodiments, the remote storage system (120) may be implemented as a file store. When implemented as a file store, the remote storage system (120) stores data as files and manages the files using the file system (110). The file system (110) may organize the files within a hierarchy using, for example, directories and/or folders.

In one or more embodiments, the remote storage system (120) may be implemented as one or more computing devices (see e.g., FIG. 4). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the remote storage system (120) described throughout this application and/or all, or a portion thereof, of the methods illustrated in FIGS. 2-3. The remote storage system may utilize, to store data, volatile storage, non-volatile storage, or any combination thereof to store the aforementioned data. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), and persistent memory (PMEM).

In one or more embodiments, the remote storage system (120) is implemented as a logical device(s). Each logical device may utilize the computing resources of any number of computing devices and thereby provide the functionality of the remote storage system (120) described throughout this application and/or all, or a portion thereof, of the methods illustrated in FIGS. 2-3.

Figure 2:
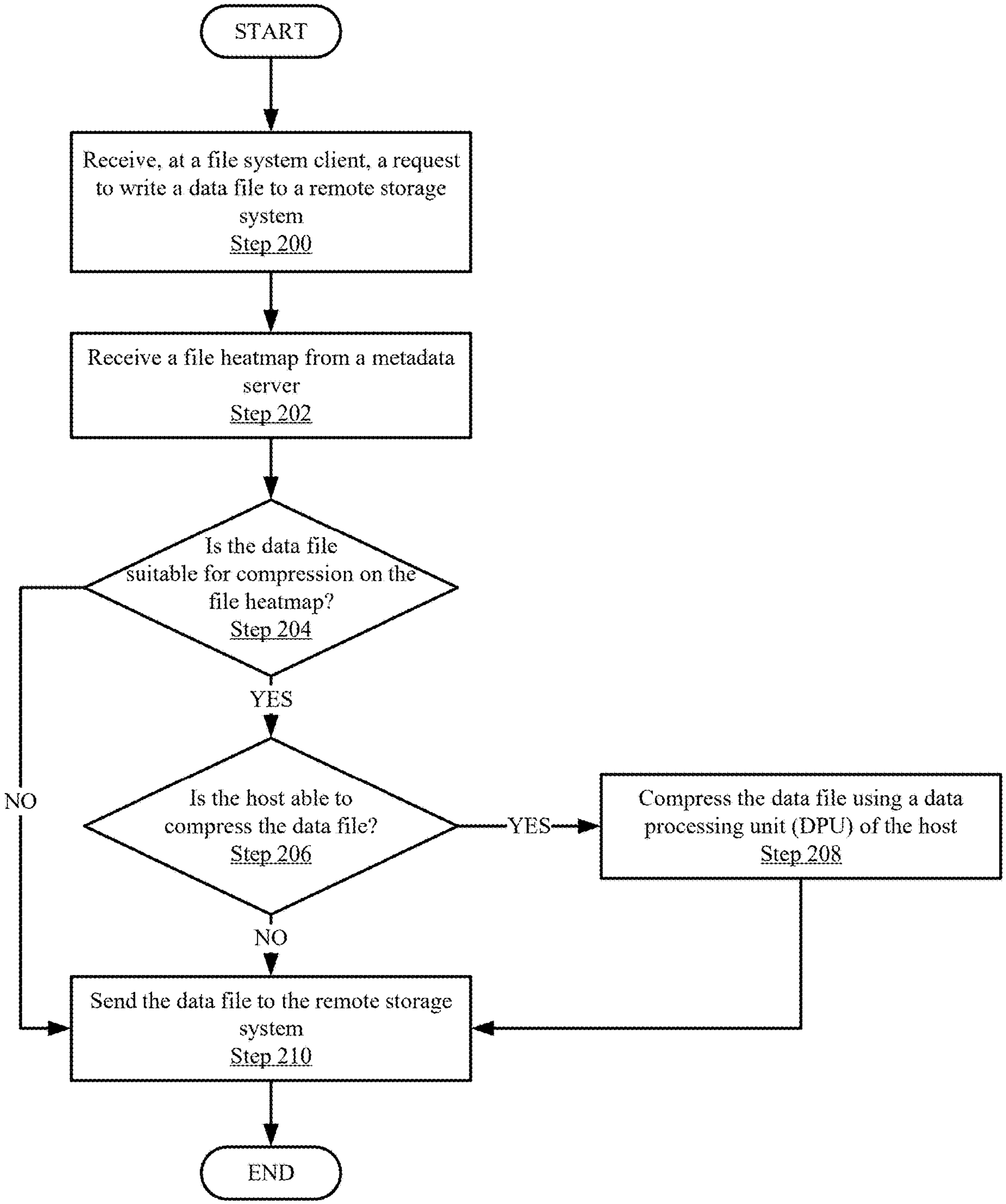
FIG. 2 shows a flowchart for a method for compressing data in accordance one or more embodiments disclosed herein.

Turning now to FIG. 2, FIG. 2 shows a flowchart for a method for compressing data in accordance one or more embodiments disclosed herein. The method of FIG. 2 may be performed by, for example, the host (e.g., 100A, FIG. 1). Other components of the system of FIG. 1 may perform all, or a portion, of the method of FIG. 2 without departing from the disclosure.

While the various steps in the flowcharts of FIGS. 2-3 are presented and described sequentially, one of ordinary skill in the relevant art will appreciate that some or all of the steps may be executed in different orders, may be combined, or omitted, and some or all steps may be executed in parallel.

In Step 200, the host receives a request to write a data file to a remote storage system (e.g., 120, FIG. 1). In one or more embodiments, the data file is an AI checkpoint for an AI model undergoing training. In one or more embodiments, the request is generated by a user of the host or as part of an automated process for data protection or storage objectives. In response to the request, the host requests a file layout mapping of the remote storage system from a file system (e.g., 110, FIG. 1) to be able to write the data file to the remote storage system.

In Step 202, the host receives a file heatmap from a metadata server (e.g., 111, FIG. 1). In one or more embodiments, the file heatmap is included with the file layout mapping of the remote storage system. The file heatmap includes a forecasted compressibility setting for each file of the data files. The file heatmap is generated by the metadata server. The generation of the file heatmap is discussed with reference to FIG. 3. In one or more embodiments, the file heatmap forecasts whether the data file is hot data which is not suitable for compression or cold data which is suitable for compression and may further provide additional details about the compression applied to the data, such as type of compression algorithm, compression ratios, etc.

In Step 204, the host makes a first determination as to whether the data file is suitable for compression on the file heatmap. Hot data is data that is frequently accessed from the remote storage system and may not be suitable for compression due to the frequent updates made to the data. Cold data is data that is not frequently accessed from the remote storage system and may be suitable for compression. The host reviews the file heatmap and makes the first determination as to whether the data file is hot or cold and therefore suitable or not suitable for compression. In one or more embodiments, the file heatmap forecasts whether the data file has a number read/write cycles below a threshold value to be cold data. Further, the data file is also checked by the host to determine if the data file is already compressed and therefore not suitable for compression. In one or more embodiments, the host uses the file heatmap to determine if the data file should be compressed. Accordingly, in one or more embodiments, if the result of the first determination is YES, the method proceeds to Step 206. If the result of the first determination is NO, the method alternatively proceeds to Step 210.

In Step 206, the host makes a second determination as to whether the host is able to compress the data file. In one or more embodiments, the data file can only be compressed if the host has the computing resources to be able to compress the data file, which may be determined by sampling the resources available on a DPU (e.g., 102A) of the host. If the DPU does not have sufficient computing resources available, the data file cannot be compressed. Accordingly, in one or more embodiments, if the result of the first determination is YES, the method proceeds to Step 208. If the result of the first determination is NO, the method alternatively proceeds to Step 210.

In Step 208, the host compresses the data file using the DPU. In one or more embodiments, the DPU compresses the data in a manner prescribed by the heatmap. Further, as discussed above, a compression accelerator may be utilized by the DPU to perform the compression of the data file. In one or more embodiments, after performing the compression operation on the data, the DPU obtains compressed data and metadata relating to the compressed data that includes information about the compression performed on the data and other attributes of the compressed data.

In Step 210, the host sends the data file to the remote storage system. In one or more embodiments, the sending of the data is considered a data transfer operation, which may also include any operation involving the sending or receiving of data. When the data file is compressed, the compressed data file is sent to the remote storage system. When the data file is not compressed, the data file is sent to the remote storage system in an uncompressed state. The data file is then stored in the remote storage server. After the data file is sent to the remote storage system, the metadata for the data file that may include a location at which the data file is stored in the remote storage system, logical space occupied by the data file, physical space occupied by the data file, a type of compression applied to the data file, and a compressibility of the data file is sent to the metadata server. This metadata may be sent by the file system client of the host, the remote storage system, or a combination thereof to update the file layout mapping and the file heatmap as described further below.

The method may end following Step 210.

In one or more embodiments, when the data file is suitable for compression but is not compressed on the host, after the data file is stored on the remote storage system, the file system retrieves the data file for compression. Then, the file system compresses the data file using a DPU or other compute resource located on the file system to obtain a compressed data file. This compressed data file is then sent back to the remote storage system for storage as described above. Further, metadata generated in this manner may be generated by the file system itself and therefore not need to be transferred from another source to the file system.

In one or more embodiments, the method described above can be used for file extents (i.e., segments of data of a data file stored in a contiguous block of storage) of the data file rather than the entirety of the data file. In such a scenario, the above discussion is applied to file extents rather than entire data files. This enables portions of a data file to be compressed while other hot portions are not compressed.

Turning now to FIG. 3, FIG. 3 shows a flowchart for a method for managing selective compression in a parallel file system in accordance one or more embodiments disclosed herein. The method of FIG. 3 may be performed by, for example, the file system (e.g., 110, FIG. 1). Other components of the system of FIG. 1 may perform all, or a portion, of the method of FIG. 3 without departing from the disclosure.

In Step 300, the file system generates a file heatmap. The file heatmap is based on read/write cycles of stored data files stored in a remote storage system. The file heatmap is generated on a metadata server (e.g., 111, FIG. 1) of the file system using a machine learning model that includes a ARIMA model. The machine learning model uses access statistics and compression ratios of stored data files on the remote storage system as inputs to form the file heatmap with a forecast for a compressibility of data files to be stored on a remote storage system (e.g., 120, FIG. 1).

In Step 302, the file system receives a request for the file heatmap from a first file system client. The first file system client (e.g., 101A, FIG. 1) is a part of a host (e.g., 100, FIG. 1) that will write a first data file to the remote storage system. Before writing the first data file, the first file system client requests a file layout mapping of the remote storage system. The request for the file layout mapping includes a request for the file heatmap.

In Step 304, the file system provides the file heatmap to the first file system client. In response to the request, the metadata server transmits the file heatmap and the file layout mapping and the file heatmap to the first file system client. The file system client uses the file heatmap and file layout mapping to store the first data file on the remote storage system.

In Step 306, the file system receives metadata on updated data files from the first file system client. The metadata includes information that the first data file is compressed by the first file system client using a DPU of the host. The updated data files are associated with the stored data files and include the first data file. The information includes access statistics and compression ratios of the updated files and is used by the file system to provide updates to the file heatmap and the file layout mapping. In one or more embodiments, the first data file is not compressed by the first file system client. In these embodiments, the metadata reflects that the first data file is stored on the remote storage system without being compressed.

In Step 308, the file system commits a first layout mapping of the first data file to the metadata server. The information on the updated files including the first data file is used to form a first layout mapping of the first data file. The first layout mapping is used by the metadata server to update the file layout mapping of the remote storage system. Updating the file layout mapping allows the file system to effectively manage the remote storage system.

In Step 310, the file system updates the file heatmap based on the first layout mapping. The file heatmap is updated to include the first data file, the compression ratio of the first data file indicating that the first data file was compressed into the first compressed data file, and that the first data file has undergone a read/write cycle. This information creates an updated file heatmap that is stored on the metadata server. The updated heatmap can be used by the first file service client or a second file service client for a second data file to determine if the second data file should be compressed. The method can be continued for successive data files, or the method may end following Step 310.

As discussed above, embodiments of the disclosure may be implemented using computing devices. FIG. 4 shows a diagram of a computing device in accordance with one or more embodiments disclosed herein. The computing device may include one or more computer processor(s) (402), non-persistent storage (404) (e.g., volatile memory, such as RAM, cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the disclosure, the processor(s) (402) may be an integrated circuit for processing instructions. For example, the computer processor(s) may be one or more cores or micro-cores of a processor. The computing device may also include one or more input devices (410), such as a touchscreen, keyboard, mouse, microphone, touchpad, electronic pen, or any other type of input device. Further, the communication interface (412) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the disclosure, the computing device may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the disclosure disclosed herein and the disclosure should not be limited only to solving the same/similar problems. The disclosure is broadly applicable to address a range of problems beyond those discussed herein.

Specific embodiments are described with reference to the accompanying figures. In the above description, numerous details are set forth as examples. It will be understood by those skilled in the art, that one or more embodiments of the present disclosure may be practiced without these specific details, and that numerous variations or modifications may be possible without departing from the scope. Certain details known to those of ordinary skill in the art are omitted to avoid obscuring the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the disclosure has been described above with respect to a limited number of embodiments, those skilled in the art, having the benefit of this disclosure, will appreciate that other embodiments can be devised which do not depart from the scope as disclosed herein. Accordingly, the scope of the disclosure should be limited only by the attached claims.

What is claimed is:

1. A method for compressing files, comprising:
- generating, at a file system, a file heatmap, wherein the file heatmap is based on read/write cycles of stored data files stored in a remote storage system;
- receiving, at a first file system client of a host, a request to write a first data file of data files to the remote storage system;
- receiving, at a file system, a request for the file heatmap from the first file system client;
- receiving, based on the request, the file heatmap at the host from a metadata server of the file system, wherein the file heatmap comprises a forecasted compressibility setting for each file of the data files;
- making a first determination, while executing a data transfer operation of the data files to the remote storage system, that the first data file is suitable for compression based on the file heatmap;
- compressing, based on the first determination, the first data file using a compression accelerator on a data processing unit (DPU) of the host to obtain a first compressed data file;
- sending the first compressed data file to the remote storage system;
- in response to sending the first compressed data file:
  - sending metadata on updated data files from the first file system client, wherein the metadata includes information that the first data file is compressed by the first file system client, and wherein the updated data files are associated with the stored data files;
  - committing, at the file system, a first layout mapping of the first data file to the metadata server; and
  - updating the file heatmap based on the first layout mapping of the first data file.

2. The method of claim 1, wherein the file heatmap is generated using an autoregressive integrated moving average model and a machine learning model.

3. The method of claim 2, wherein the autoregressive integrated moving average model uses access statistics and compression ratios of the files as inputs to form the file heatmap with a forecast for a compressibility of the first data file.

4. The method of claim 1, wherein the first layout mapping of the first compressed data file indicates the first compressed data file has undergone a read/write cycle.

5. The method of claim 1, further comprising:

receiving, at the first file system client, a second request to write a second data file of the data files in the file system to the remote storage system;

receiving, after receiving the second request, an updated file heatmap from the metadata server;

making a second determination, while executing a second data transfer operation of the data files to the remote storage system, that the second data file is suitable for compression using the updated file heatmap;

in response to the second determination, making a third determination that the host is not able to compress the second data file; and sending, in response to the second determination, the second data file to the remote storage system.

6. The method of claim 5, wherein the third determination is made because the DPU does not have computing resources available to compress the second data file.

7. The method of claim 5, wherein, after the second data file is sent to the remote storage system, the file system retrieves the second data file and compresses the second data file using a second DPU of the file system to form a second compressed data file.

8. The method of claim 1, wherein the first determination is based on a number read/write cycles of the first data file being below a threshold value.

* * * * *